United States Patent
Meibusch et al.

(10) Patent No.: US 11,334,474 B2
(45) Date of Patent: *May 17, 2022

(54) FAST CHANGE IMPACT ANALYSIS TOOL FOR LARGE-SCALE SOFTWARE SYSTEMS

(71) Applicant: Oracle International Corporation, Redwood Shores, CA (US)

(72) Inventors: David John-Bruce Meibusch, Brisbane (AU); Yang Zhao, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/163,241

(22) Filed: Jan. 29, 2021

(65) Prior Publication Data

US 2021/0149794 A1 May 20, 2021

Related U.S. Application Data

(63) Continuation of application No. 16/244,567, filed on Jan. 10, 2019, now Pat. No. 10,936,478.

(51) Int. Cl.
*G06F 9/44* (2018.01)
*G06F 11/36* (2006.01)
(Continued)

(52) U.S. Cl.
CPC ......... *G06F 11/3688* (2013.01); *G06F 8/433* (2013.01); *G06F 11/3086* (2013.01)

(58) Field of Classification Search
CPC ... G06F 8/433; G06F 11/3086; G06F 11/3688
(Continued)

(56) References Cited

U.S. PATENT DOCUMENTS 7,962,891 B2   6/2011  Kimelman et al.
9,836,390 B2 * 12/2017  Boshernitsan ........ G06F 11/368
(Continued)

FOREIGN PATENT DOCUMENTS

WO      2016073735 A1     5/2016

OTHER PUBLICATIONS

D.M. German et al., "Change Impact Graphs: Determining The Impact of Prior Code Changes", 2009, Information and Software Technology, 15 pages (Year: 2009).*
(Continued)

*Primary Examiner* — Ted T. Vo
(74) *Attorney, Agent, or Firm* — Ferguson Braswell Fraser Kubasta PC

(57) ABSTRACT

A method may include obtaining original source code including entities. The entities each correspond to a location in the original source code. The method may further include during an offline phase and by a computer processor, generating, from the original source code, (i) a dependency graph including nodes corresponding to the entities and (ii) a location index that maps each location in the original source code to one of the nodes, and during an online phase following the offline phase and using the dependency graph and the location index: identifying modified locations in the original source code by comparing modified source code to the original source code, obtaining, for each of the modified locations and by searching the location index, matching nodes, determining, for each of the matching nodes, impacted nodes reachable from the matching node, and identifying, using the location index, impacted entities corresponding to the impacted nodes.

17 Claims, 7 Drawing Sheets

(51) Int. Cl.
G06F 11/30 (2006.01)
G06F 8/41 (2018.01)

(58) Field of Classification Search
USPC ........ 717/101–103, 120–122, 124, 126–127, 717/131–133
See application file for complete search history.

(56) References Cited

U.S. PATENT DOCUMENTS

| | | | | |
|---|---|---|---|---|
| 10,176,234 | B2* | 1/2019 | Gould | G06F 16/176 |
| 10,205,637 | B2* | 2/2019 | Porras | H04L 41/147 |
| 10,379,812 | B2* | 8/2019 | Kenedy | G06F 16/955 |
| 10,417,119 | B2* | 9/2019 | Francis | G06F 11/3692 |
| 10,936,478 | B2* | 3/2021 | Meibusch | G06F 11/368 |
| 2007/0112870 | A1 | 5/2007 | Korupolu et al. | |

OTHER PUBLICATIONS

Acharya, M. et al., "Practical Change Impact Analysis Based on Static Program Slicing for Industrial Software Systems"; In Proceedings of the 33rd International Conference on Software Engineering, ACM, May 21, 2011; pp. 746-755 (10 pages).

Badri, L. et al., "Supporting Predictive Change Impact Analysis: A Control Call Graph Based Technique"; In Proceedings of the 12th Asia-Pacific Software Engineering Conference, APSEC Dec. 15-17, 2005, pp. 167-175 (9 pages).

Breech, B. et al., "Integrating Influence Mechanisms into Impact Analysis for Increased Precision"; In Proceedings of the 22nd IEEE International Conference on Software Maintenance, ICSM, Sep. 24-27, 2006, pp. 55-65 (11 pages).

Briand, L.C. et al., "Using Coupling Measurement for Impact Analysis in Object-Oriented Systems"; In Proceedings of the IEEE International Conference on Software Maintenance (ICSM), Aug. 30-Sep. 3, 1999, pp. 475-482 (8 pages).

Kagdi, H., et al., "Blending Conceptual and Evolutionary Couplings to Support Change Impact Analysis in Source Code"; In Proceedings of 17th IEEE Working Conference on Reverse Engineering (WCRE'10), Oct. 13-16, 2010 (10 pages).

Lee, M. et al., "Algorithmic Analysis of the Impacts of Changes to Object-Oriented Software"; In Proceedings of the 34th International Conference on Technology of Object-Oriented Languages and Systems (TOOLS) Aug. 4, 2000, pp. 61-70 (9 pages).

Poshyvanyk, D. et al., Using Information Retrieval Based Coupling Measures for Impact Analysis:; Empirical Software Engineering, vol. 14(1), Feb. 2009, pp. 5-32 (27 pages).

Sun, X. et al., "Change Impact Analysis Based on a Taxonomy of Change Types", In Proceedings of the IEEE 34th Annual Computer Software and Applications Conference (COMPSAC), Jul. 19-23, 2010, pp. 373-382 (10 pages).

Bajracharya, Sushil et al., "Sourcerer: An infrastructure for large-scale collection and analysis of open-source code", 2014, Science of Computer Programming, vol. 79, pp. 241-259 (Year: 2014).

Mercer, Eric et al., "Computing and Visualizing the Impact of Change with Java PathFinder Extensions", 2012, ACM, 5 pages (Year: 2012).

* cited by examiner

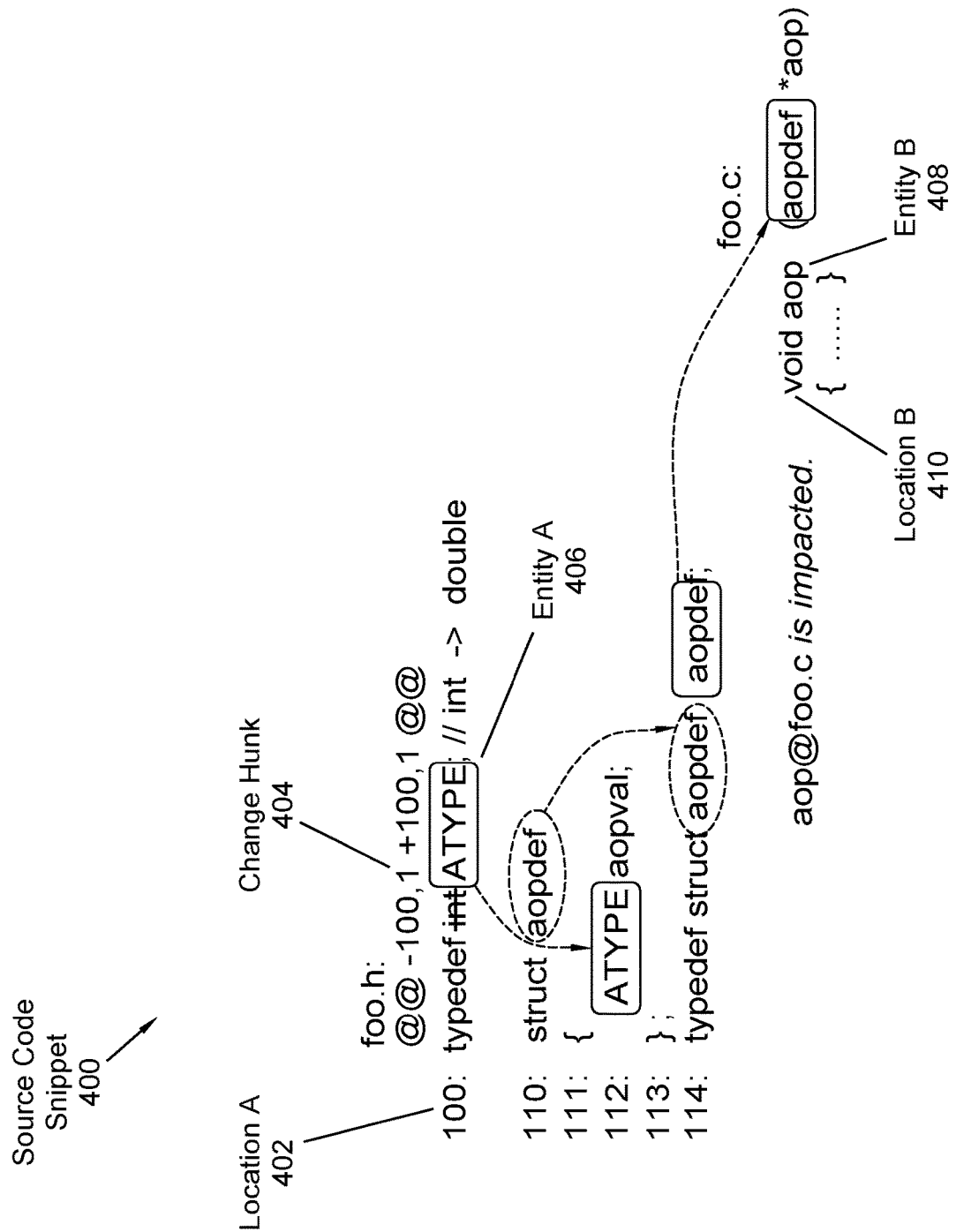

FAST CHANGE IMPACT ANALYSIS TOOL FOR LARGE-SCALE SOFTWARE SYSTEMS

CROSS-REFERENCE TO RELATED APPLICATION

The present application is a continuation application of and, thereby, claims benefit under 35 U.S.C. § 120 to U.S. patent application Ser. No. 16/244,567, entitled, "A FAST CHANGE IMPACT ANALYSIS TOOL FOR LARGE-SCALE SOFTWARE SYSTEMS," filed on Jan. 10, 2019, having the same inventors, and incorporated herein by reference in its entirety.

BACKGROUND

Change impact analysis can identify source code entities impacted by source code changes. Identifying impacted source code entities may be useful during testing of the source code. Conventional change impact analysis techniques using static program analysis are precise, but computationally expensive, and therefore are practical only when applied to small-scale software.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining original source code including entities. The entities each correspond to a location in the original source code. The method further includes during an offline phase and by a computer processor, generating, from the original source code, (i) a dependency graph including nodes corresponding to the entities and (ii) a location index that maps each location in the original source code to one of the nodes, and during an online phase following the offline phase and using the dependency graph and the location index: identifying modified locations in the original source code by comparing modified source code to the original source code, obtaining, for each of the modified locations and by searching the location index, matching nodes, determining, for each of the matching nodes, impacted nodes reachable from the matching node, and identifying, using the location index, impacted entities corresponding to the impacted nodes.

In general, in one aspect, one or more embodiments relate to a system including a memory coupled to a computer processor, and a repository configured to store code original source code including entities. The entities each correspond to a location in the original source code. The repository is further configured to store modified source code, a dependency graph including nodes corresponding to the entities, and a location index that maps each location in the original source code to one of the nodes. The system further includes a difference generator, executing on the computer processor and using the memory, configured to identify modified locations by comparing the modified source code to the original source code. The system further includes an impact analyzer, executing on the computer processor and using the memory, configured to: during an offline phase, generate (i) the dependency graph from the original source code and (ii) the location index, and during an online phase following the offline phase and using the dependency graph and the location index: obtain, for each of the modified locations and by searching the location index, matching nodes, determine, for each of the matching nodes, impacted nodes reachable from the matching node, and identify, using the location index, impacted entities corresponding to the impacted nodes. The difference generator identifies the modified locations during the online phase.

In general, in one aspect, one or more embodiments relate to a non-transitory computer readable medium including instructions that, when executed by a computer processor, perform: obtaining original source code including entities. The entities each correspond to a location in the original source code. The instructions further perform generating, from the original source code, (i) a dependency graph including nodes corresponding to the entities and (ii) a location index that maps each location in the original source code to one of the nodes, and during an online phase following the offline phase and using the dependency graph and the location index: identifying modified locations in the original source code by comparing modified source code to the original source code, obtaining, for each of the modified locations and by searching the location index, matching nodes, determining, for each of the matching nodes, impacted nodes reachable from the matching node, and identifying, using the location index, impacted entities corresponding to the impacted nodes.

Other aspects of the invention will be apparent from the following description and the appended claims.

BRIEF DESCRIPTION OF DRAWINGS

FIG. 4A and FIG. 4B show examples in accordance with one or more embodiments of the invention.

DETAILED DESCRIPTION

Figure 1A:
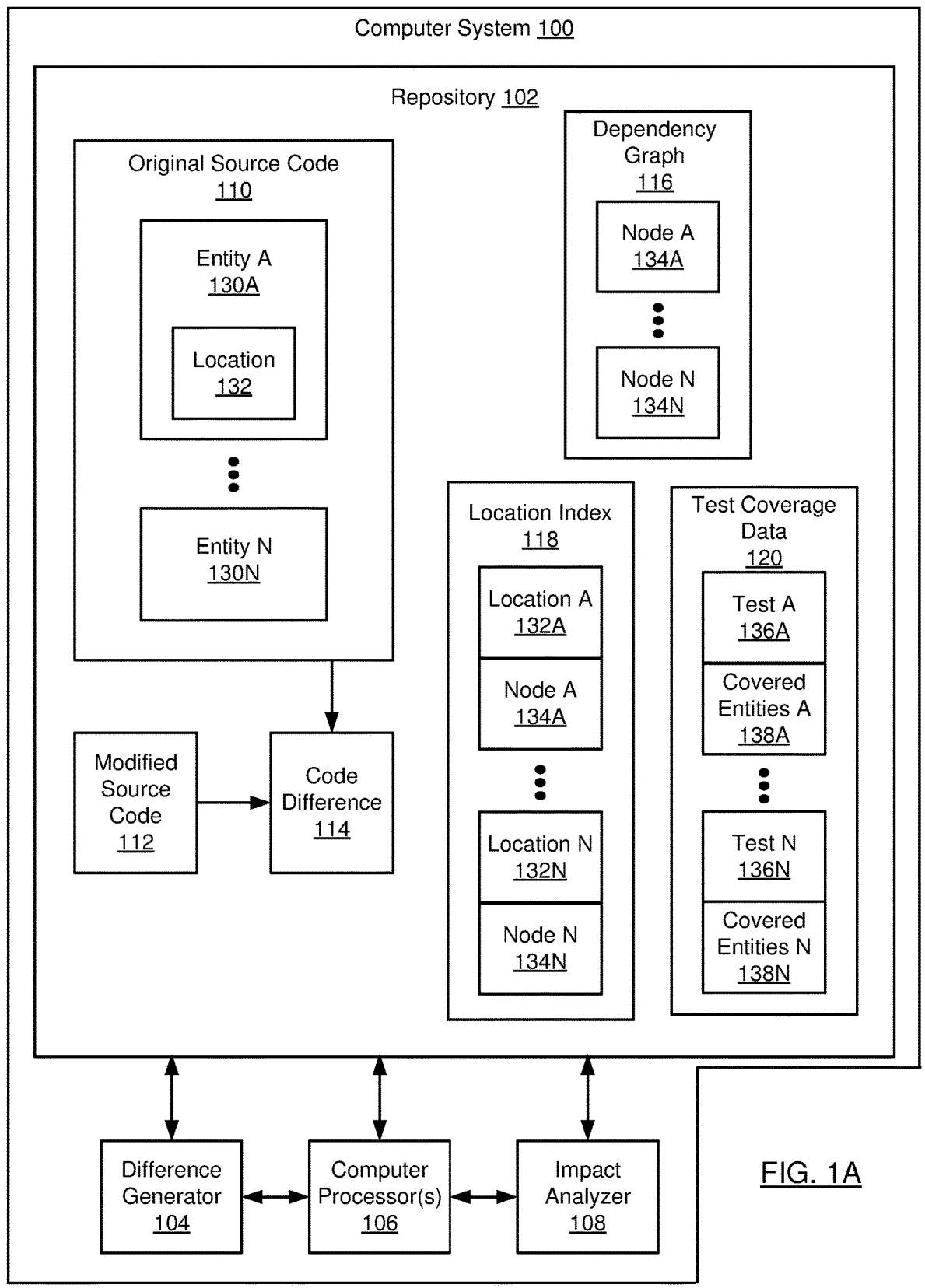
FIG. 1A and FIG. 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a method, system, and computer-readable medium for change impact analysis. In one or more embodiments, during an offline phase, a dependency graph and location index are generated for original source code. The location index may map each location in the original source code to a node in the dependency graph. Each location may correspond to an entity in the original source code. In one or more embodiments, during an online phase, modified locations in the original source code are identified by textually comparing modified source code to the original source code. The location index may be queried to identify nodes in the dependency graph matching each modified location. The dependency graph may be queried to identify impacted nodes reachable from each matching node. Impacted entities in the original source code corresponding to the impacted nodes may then be identified. Extracting source code location information into a separate location index facilitates scalability by reducing the size of the dependency graph and supporting rapid query processing to determine entities impacted by modifications to the original source code.

FIG. 1A shows a computer system (100) in accordance with one or more embodiments of the invention. As shown in FIG. 1A, the computer system (100) includes a repository (102), a difference generator (104), one or more computer processors (106), and an impact analyzer (108). In one or more embodiments, the computer system (100) takes the form of the computing system (500) described with respect to FIG. 5A and the accompanying description below or takes the form of the client device (526) described with respect to FIG. 5B. In one or more embodiments, the computer processor(s) (106) takes the form of the computer processor(s) (502) described with respect to FIG. 5A and the accompanying description below.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes original source code (110), modified source code (112), a code difference (114), a dependency graph (116), a location index (118), and test coverage data (120). In one or more embodiments, the original source code (110) includes entities (130A, 130N). Each entity (130A) may be represented using a collection of computer instructions (e.g., statements) written in a programming language. Examples of entities (130A, 130N) may include classes, functions, variables, files and/or other logical divisions of the original source code (110).

In one or more embodiments, each entity (130A) is associated with a location (132) in the original source code (110). In one or more embodiments, the location (132) specifies a file and one or more lines within the file. A line may include a string of characters followed by a line separator, where the string of characters may have a predetermined maximum length. In one or more embodiments, a line may correspond to one or more computer instructions. Alternatively, a line may correspond to a portion of a computer instruction. In one or more embodiments, the location (132) specifies a position within a line. For example, the position may include a range of column numbers within the line. In one or more embodiments, each entity (130A) is associated with an identifier.

In one or more embodiments, the modified source code (112) is the result of applying one or more modifications to the original source code (110). For example, a modification may add, delete, or modify one or more entities (130A, 130N) in the original source code (110). In one or more embodiments, the code difference (114) is a set of modifications that, when applied to the original source code (110), result in the modified source code (112).

In one or more embodiments, a modification includes a location in the original source code (110) and a location in the modified source code (112). For example, in the standardized unified diff format produced by GNU diff (and other utilities), the representation of a modification includes a "change hunk" that specifies, for both an original file and a modified file, a line number and the number of lines to which the modification applies. Many source code version control systems (e.g., GIT, Mercurial) represent modifications using the unified diff format, given an original file and a modified file.

Continuing with FIG. 1A, in one or more embodiments, the dependency graph (116) includes nodes (134A, 134N). Each node (134A) may correspond to an entity (130A) in the original source code (110). In one or more embodiments, each node (134A) has a node type. The node type may be based on the entity (130A) corresponding to the node (134A). For example, the node type may be: function, class, variable, file, etc.

The dependency graph (116) may be represented using various types of graphs. For example, the dependency graph (116) may be a property graph, a class coupling matrix, class/member dependency graph, call graph, influence between functions and variables, data dependency graph, program dependency graph, etc. In one or more embodiments, the dependency graph (116) includes edges (not shown) each representing a dependency relation between two nodes. In one or more embodiments, each edge has an edge type. The edge type may be based on the dependency relation corresponding to the edge. For example, the edge may be a directed edge (X, Y) indicating that a node X depends on a node Y. Continuing this example, node X may correspond to a statement that calls a function corresponding to node Y. Alternatively, node Y may correspond to a statement that defines a value used by a statement corresponding to node X. In one or more embodiments, two nodes may be mutually dependent on each another. For example, there may be a directed edge (X, Y) and a directed edge (Y, X).

Figure 1B:
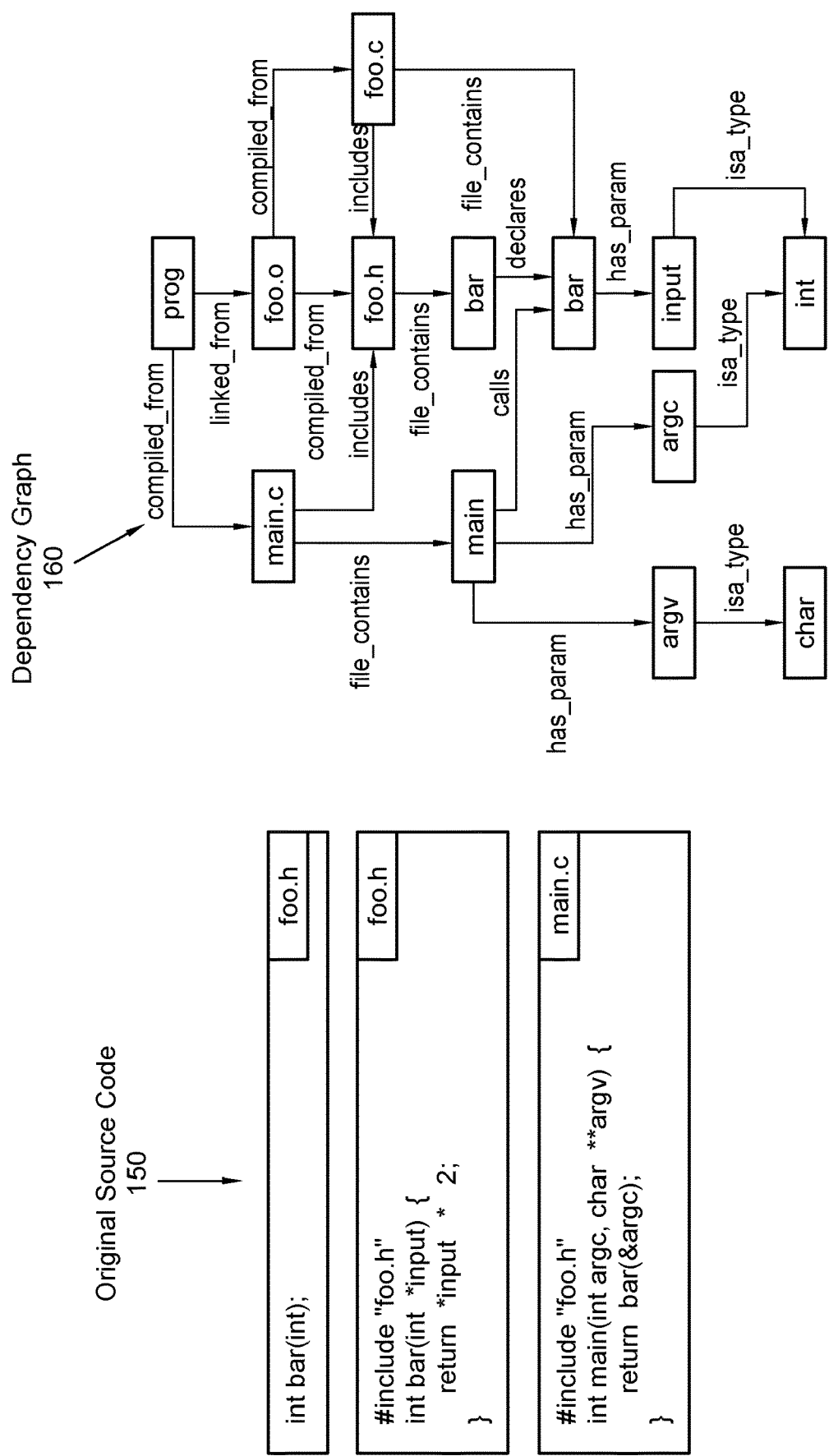

FIG. 1B shows an example of a dependency graph (160) for original source code (150) written in the C programming language. In this simplified example, nodes of the dependency graph (160) represent entities (e.g., files, functions, and variables) and edges represent dependency relations between entities (e.g., reads, calls, and contains). For finer granularity in the representation, a dependency graph may include additional nodes corresponding to statements and additional edges representing the flow of control among statements.

Returning to FIG. 1A, in one or more embodiments, the location index (118) maps locations (132A, 132N) to nodes (134A, 134N). In other words, the location index (118) may map each location (132A) in the original source code (110) to a corresponding node (134A) in the dependency graph (116). In one or more embodiments, using the location index (118) reduces the storage requirements for the dependency graph (116), since the dependency graph (116) does not need to store any information regarding the locations of entities (130A, 130N) corresponding to nodes (134A, 134N). For example, the dependency graph (116) may be stored in non-persistent storage (e.g., the non-persistent storage (506) described with respect to FIG. 5A), even when the original source code (110) is very large (e.g., when the original source code (110) includes millions of lines of code). The location index (118) may be optimized for rapid access. For example, the location index (118) may be implemented using various techniques, including balanced trees, B+ trees, hashes, etc.

In one or more embodiments, the test coverage data (120) maps tests (136A, 136N) to covered entities (138A, 138N). In one or more embodiments, the original source code (110) may be tested using tests (136A, 136N) each covering covered entities (138A, 138N) of the original source code (110). For example, a test (136A) may exercise portions of the original source code (110) using a range of inputs and settings in order to assess the behavior of the original source code (110) under a range of scenarios, in order to identify errors or deviations from the desired behavior of the original source code (110). In one or more embodiments, a test (136A) is a collection of computer instructions written in a programming language.

Continuing with FIG. 1A, in one or more embodiments, the difference generator (104) may be implemented in hardware (e.g., circuitry), software, firmware, and/or any combination thereof. In one or more embodiments, the difference generator (104) includes functionality to identify modified locations in the original source code (110) by comparing the modified source code (112) to the original source code (110).

In one or more embodiments, the impact analyzer (108) may be implemented in hardware (e.g., circuitry), software, firmware, and/or any combination thereof. In one or more embodiments, the impact analyzer (108) includes functionality to generate a dependency graph (116) and a location index (118) for the original source code (110). In one or more embodiments, the impact analyzer (108) may include functionality to obtain nodes (134A, 134N) in the dependency graph (116) matching a location in the original source code (110). The impact analyzer (108) may include functionality to identify entities (130A, 130N) in the original source code (110) impacted by a modification to the original source code (110). The impact analyzer (108) may include functionality to query the dependency graph (116) to identify nodes (134A, 134N) reachable from a node in the dependency graph (116).

In one or more embodiments, the computer processor (106) includes functionality to execute the difference generator (104) and the impact analyzer (108).

While FIG. 1A shows a configuration of components, other configurations may be used without departing from the scope of the invention. For example, various components may be combined to create a single component. As another example, the functionality performed by a single component may be performed by two or more components.

Figure 2:
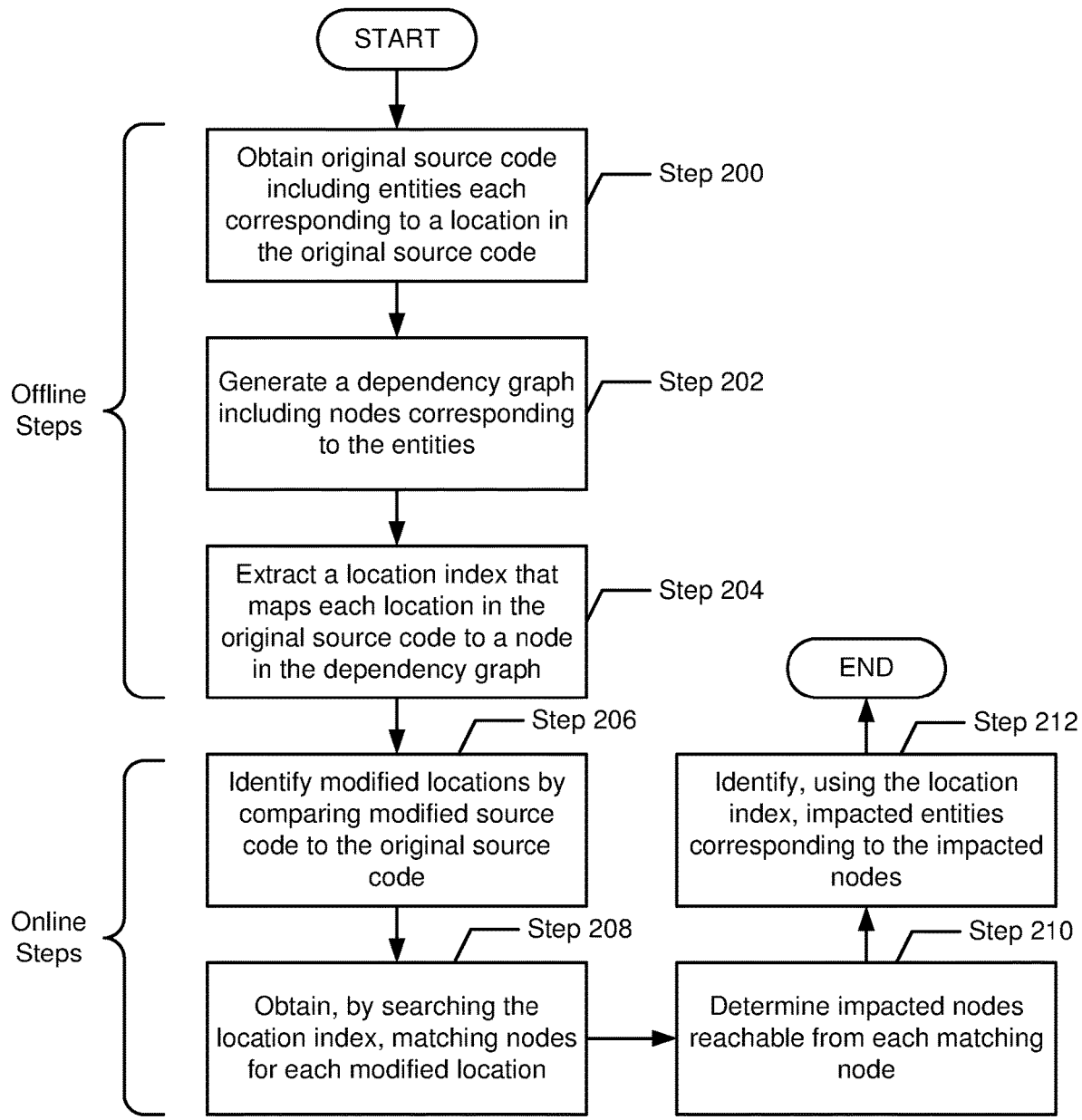
FIG. 2 and FIG. 3 show flowcharts in accordance with one or more embodiments of the invention.

FIG. 2 shows a flowchart in accordance with one or more embodiments of the invention. The flowchart depicts a process for change impact analysis. One or more of the steps in FIG. 2 may be performed by the components (e.g., the difference generator (104) and/or the impact analyzer (108) of the computer system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

The steps shown in FIG. 2 are divided into offline steps and online steps. The offline steps, Step 200, Step 202, and Step 204, may incur significant computational overhead while generating the dependency graph and location index. For example, generating the dependency graph and the location index from original source code containing millions of lines of code may require several hours. The dependency graph and location index are used during the execution of the online steps, Step 206, Step 208, Step 210, and Step 212, which perform quick source code comparisons and queries of the dependency graph and location index to identify impacted entities for modified source code. For example, performing textual source code comparisons and querying the dependency graph and location index may require less than a minute, even when the original source code contains millions of lines of code.

Initially, in Step 200, original source code including entities each corresponding to a location in the original source code is obtained. For example, the original source code may be obtained from a repository.

In Step 202, a dependency graph including nodes corresponding to the entities is generated from the original source code. In one or more embodiments, the impact analyzer generates the dependency graph by performing a static analysis of the original source code. The static analysis may be a method of analyzing the original source code without executing the original source code. For example, the static analysis may analyze and/or propagate dependencies among entities and references, trace function calls, etc.

In Step 204, a location index that maps each location in the original source code to a node in the dependency graph is extracted. In one or more embodiments, the static analysis generates the location index. For example, the static analysis may synthesize records in the location index by: 1) noting the location of each entity in the original source code, 2) identifying the node in the dependency graph corresponding to the entity, and 3) associating the location with the node.

In Step 206, modified locations in the original source code are identified by comparing modified source code to the original source code. In one or more embodiments, the difference generator may use a data comparison tool to identify the modified locations. In one or more embodiments, a textual data comparison tool may accept the original source code and the modified source code as input, and generate a code difference that identifies the modified locations in the original source code.

In Step 208, matching nodes are obtained for each modified location, by searching the location index. In other words, nodes that match the modified location may be obtained by querying the location index with the modified location. For example, multiple nodes corresponding to multiple entities may match a location (e.g., a line number and a file name) in the original source code. Thus, the impact analyzer may quickly obtain the matching nodes without searching the nodes in the dependency graph.

In Step 210, impacted nodes reachable from each matching node are determined. In one or more embodiments, a node is reachable from the matching node when there is a path through the dependency graph from the matching node to the reachable node. The path may include a series of nodes connected by edges, where the endpoints of the path are the matching node and the reachable node. In one or more embodiments, the impacted nodes are filtered by node type. For example, when determining which tests to execute on the modified source code, the impacted nodes may be required to have the node type "function", to facilitate the identification of functions whose logic may be impacted by the modified source code. Alternatively, in one or more embodiments, the impacted nodes are filtered using the edge type of an edge in the path connected to the impacted node. For example, each impacted node may be required to be connected to an edge with a specific edge type. Continuing this example, the edge type may be "has parameter".

In one or more embodiments, the path is computed by a graph traversal algorithm that queries the dependency graph. For example, an algorithm that computes the transitive closure of a graph (e.g., the Floyd-Warshall algorithm) may be used to identify nodes reachable from the matching node. In one or more embodiments, a breadth-first search algorithm is used to identify reachable nodes. In other words, once a reachable node R is found, then R's sibling nodes may be examined before examining R's descendant nodes. In one or more embodiments, once R is identified as a reachable node, the reachability algorithm does not search R's descendant nodes.

In Step 212, impacted entities corresponding to the impacted nodes are identified. In one or more embodiments, the impacted entity corresponding to each impacted node is the entity at the location in the original source code corresponding to the impacted node. The location in the original source code corresponding to the impacted node may be obtained by querying the location index with the impacted node.

Identifying the entities impacted by a modification to the original source code is efficient due to the extraction of location information into a location index that is separate from the dependency graph, which reduces the memory footprint of the dependency graph and facilitates the rapid identification of entities impacted by the modification (i.e., without requiring a static analysis of the original source code). For example, an implementation of the process described in FIG. 2 resulted in an average runtime of less than one minute per change request to determine impacted functions in a codebase with more than ten million lines of C code.

Figure 3:
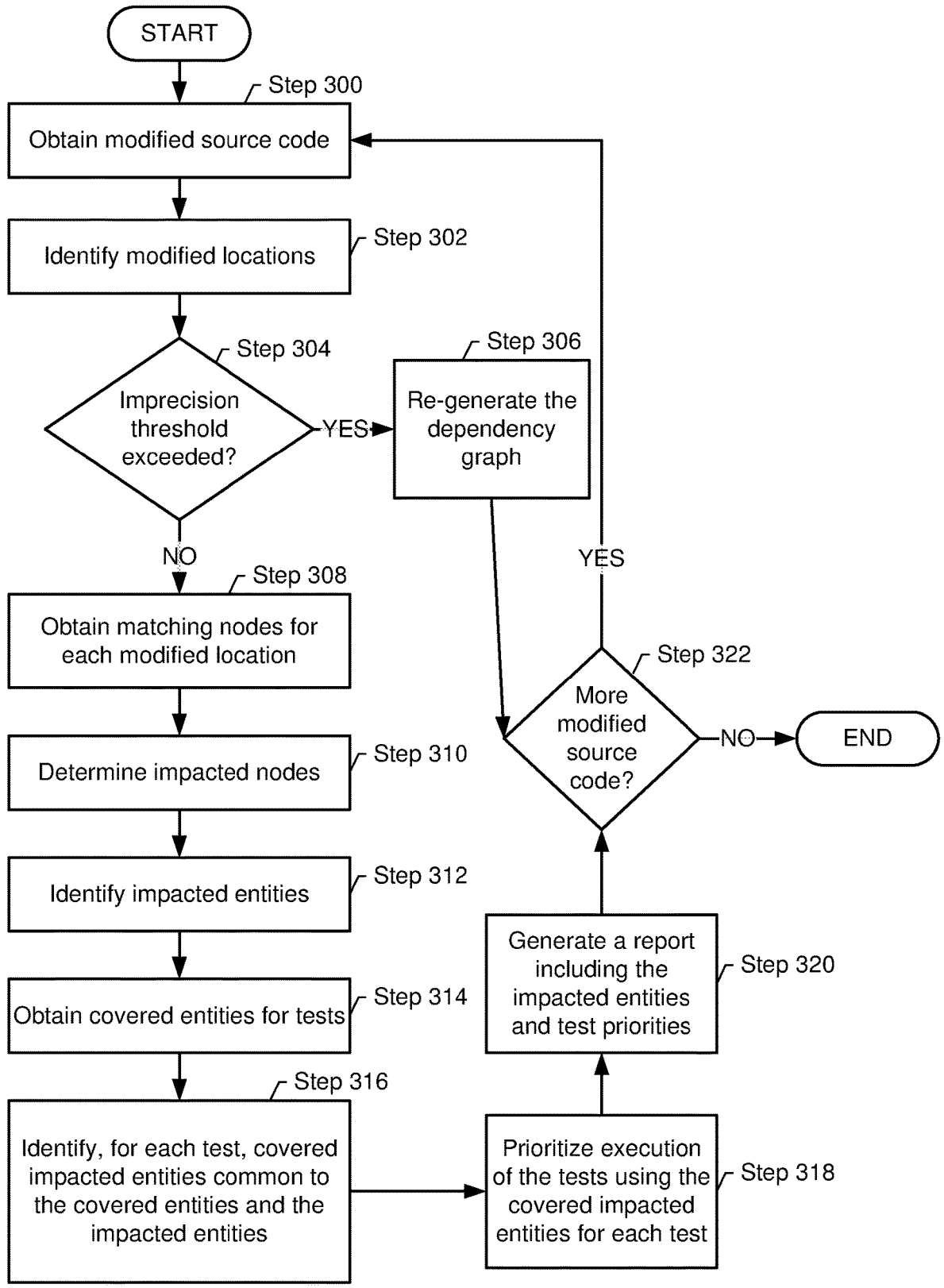

FIG. 3 shows a flowchart in accordance with one or more embodiments of the invention. The flowchart depicts a process for change impact analysis. One or more of the steps in FIG. 3 may be performed by the components (e.g., the difference generator (104) and/or the impact analyzer (108) of the computer system (100)), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 300, modified source code is obtained. For example, the modified source code may be obtained from a repository.

In Step 302, modified locations in the original source code are identified (see description of Step 206 above).

If, in Step 304, it is determined that a level of imprecision of the dependency graph exceeds a predetermined threshold, then Step 306 below is executed. In one or more embodiments, the level of imprecision is based on the number of new entities added by the modifications of the code difference that are not present in the original source code. For example, the new entities may have no corresponding node in the dependency graph, since the dependency graph was generated, in Step 202 above, using only the entities present in the original source code. Thus, the dependency graph may not be able to provide precise information regarding the new entities. Continuing this example, if the predetermined threshold is 5 new entities, and the code difference adds 7 new entities, then the level of imprecision exceeds the threshold.

Otherwise, if Step 304 determines that the level of imprecision of the dependency graph does not exceed the predetermined threshold, then Step 308 below is executed.

In Step 306, the dependency graph is re-generated using the modified source code (see description of Step 202 above). Then, Step 322 below is executed.

In Step 308, matching nodes are obtained for each modified location (see description of Step 208 above).

In Step 310, impacted nodes reachable from each matching node are determined (see description of Step 210 above).

In Step 312, impacted entities corresponding to the impacted nodes are identified (see description of Step 212 above).

In Step 314, covered entities for tests are obtained. In one or more embodiments, entities covered by each test are obtained by querying the test coverage data. The test coverage data may map each test to covered entities in the original source code. The test coverage data may be based on the output of a code coverage tool. For example, during debugging, the computer system (e.g., a virtual machine executing on the computer system) may permit extraction of locations in the original source code corresponding to executable code (e.g., corresponding to an executed test).

In Step 316, for each test, covered impacted entities common to the impacted entities and the covered entities for the test are identified. That is, the covered impacted entities may be the subset of the impacted entities identified in Step 312 above that intersect with the covered entities for the test.

In Step 318, execution of the tests is prioritized using the covered impacted entities for each test. In one or more embodiments, the impact analyzer prioritizes the tests using the number of covered impacted entities for each test. For example, the test that covers the largest number of impacted entities may be assigned the highest priority. The prioritization of tests may improve the likelihood that defects in the modified source code and/or original source code will be identified. For example, the testing strategy may restrict testing to tests whose priority exceeds a predetermined threshold.

In Step 320, a report is generated including the impacted entities and the test priorities. In one or more embodiments, the report includes the covered impacted entities for each test.

If, in Step 322, it is determined additional modified source code may be obtained, then Step 300 above is executed, and the impact analyzer performs another iteration of the change impact analysis process described in FIG. 3.

Figure 4B:
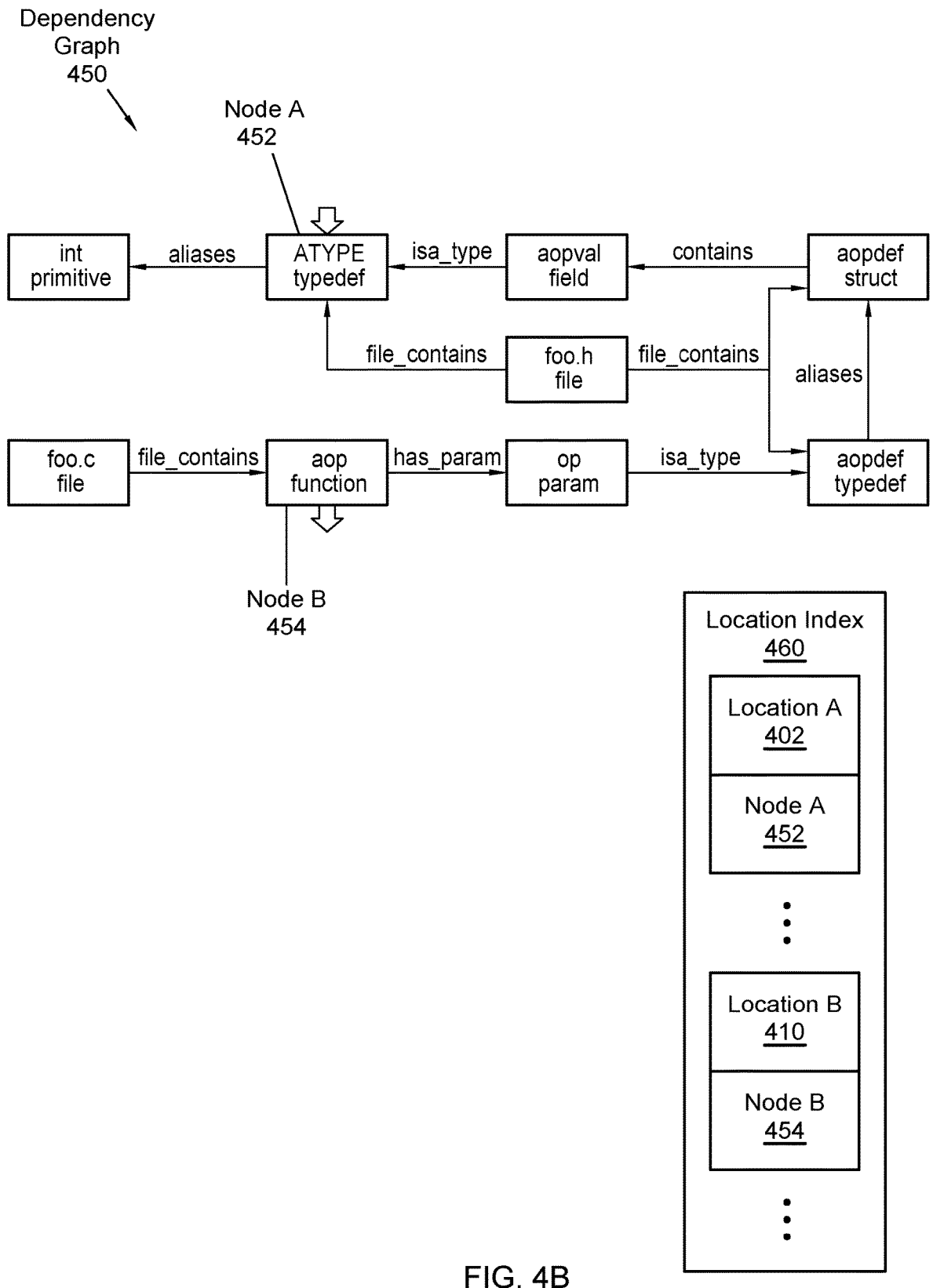

The following example is for explanatory purposes only and not intended to limit the scope of the invention. FIG. 4A and FIG. 4B show an implementation example in accordance with one or more embodiments of the invention. The source code snippet (400) in FIG. 4A shows that at location A (402), the definition of entity A (404) ATYPE has been modified from int to double. The source code snippet (400) illustrates both the original source code ((110) in FIG. 1A) and the modified source code ((112) in FIG. 1A).

FIG. 4B illustrates a dependency graph (450) ((116) in FIG. 1A) generated from the source code snippet (400). Node A (452) in the dependency graph (450) corresponds to entity A (404). FIG. 4B also illustrates the location index (460) ((118) in FIG. 1A), which maps location A (402) of the source code snippet (400) to node A (452) of the dependency graph (450).

The difference generator ((104) in FIG. 1A) identifies location A (402) as a modified location in the source code snippet (400) using the diff data comparison tool. The output of the diff data comparison tool includes a change hunk (404), which indicates that the modified location occurs at line 100 of file foo.h.

The impact analyzer ((108) in FIG. 1A) then queries the location index (460) with location A (402) to obtain the node in the dependency graph (450), in this case, node A (452), that matches location A (402). Next, the impact analyzer searches for impacted nodes in the dependency graph (450) that are reachable via a path starting with node A (452). In this example, the impacted nodes are restricted to be nodes whose node type is "function", since the goal of the impact analysis is to determine which functions to test in response to the modification to the source code snippet (400).

The impact analyzer first finds the edge in the dependency graph (450) connecting node A (452) to a node corresponding to the entity aopval at line 112 of the source code snippet (400). Then, the impact analyzer finds the edge to a node corresponding to the entity aopdef at line 110 of the source code snippet (400). Then, the impact analyzer finds the edge to a node corresponding to the entity aopdef at line 114 of the source code snippet (400). Then, the impact analyzer finds the edge to a node corresponding to the entity op (not shown) located in the file foo.c of the source code snippet (400). Finally, the impact analyzer finds the edge to node B (454). The impact analyzer determines that node B (454) is impacted because node B (454) satisfies the restriction that impacted nodes have the node type "function". The impact analyzer queries the location index (460) with node B (454) to find the location in the source code snippet (400) corresponding to node B (454), in this case, location B (410), which corresponds to entity B (408) aop. The impact analyzer then prioritizes tests of the source code snippet (400) that cover entity B (408), the entity impacted by the modification to the source code snippet (400).

Figure 5A:
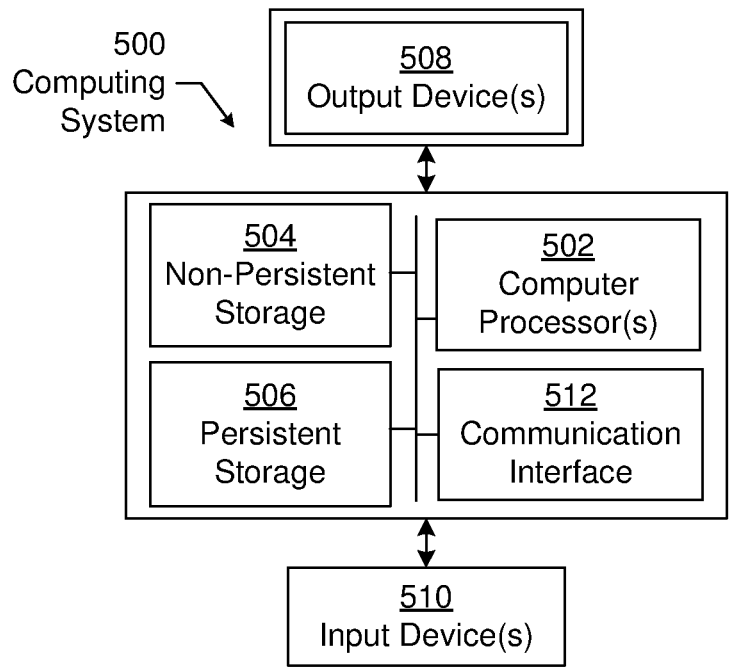
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
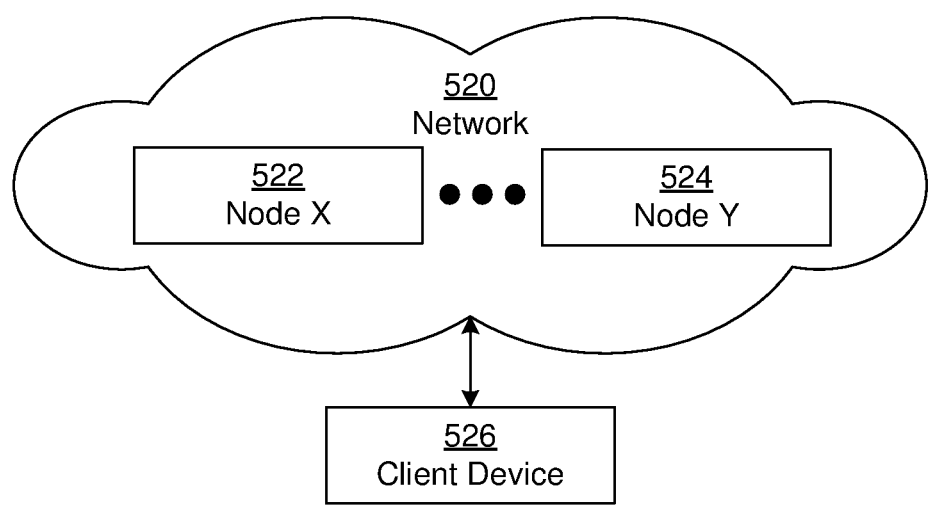

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   obtaining original source code comprising a plurality of entities, wherein the plurality of entities each correspond to a location in the original source code;
   during an offline phase and by a computer processor, generating, from the original source code, (i) a dependency graph comprising a plurality of nodes corresponding to the plurality of entities and (ii) a location index that maps each location in the original source code to one of the plurality of nodes; and
   during an online phase following the offline phase and using the dependency graph and the location index:
      identifying a plurality of modified locations in the original source code by comparing modified source code to the original source code;
      determining, based on the comparing of the modified source code to the original source code, that a level of imprecision of the dependency graph exceeds a predetermined threshold;
      in response to determining that the level of imprecision exceeds the predetermined threshold, re-generating the dependency graph using the modified source code;
      obtaining, for each of the plurality of modified locations and by searching the location index, matching nodes of the plurality of nodes;
      determining, for each of the matching nodes, impacted nodes of the plurality of nodes reachable from the matching node; and
      identifying, using the location index, impacted entities of the plurality of entities corresponding to the impacted nodes.

2. The method of claim 1, further comprising:
   obtaining, for each of a plurality of tests, covered entities of the plurality of entities;

identifying, for each of the plurality of tests, covered impacted entities common to the impacted entities and the covered entities for the test; and obtaining test priorities by prioritizing execution of the plurality of tests using the covered impacted entities for each of the plurality of tests.

3. The method of claim 2, further comprising:

generating a report comprising the impacted entities and the test priorities.

4. The method of claim 1, wherein comparing the modified source code to the original source code comprises determining modifications that result in the modified source code when applied to the original source code, and wherein each of the modifications comprises a first location in the original source code and a second location in the modified source code.

5. The method of claim 1, wherein identifying the impacted nodes reachable from the matching node comprises:

identifying, for each of the impacted nodes, a path in the dependency graph between the matching node and the impacted node, wherein the impacted node has a specific node type.

6. The method of claim 1, wherein identifying the impacted nodes reachable from the matching node comprises:

identifying, for each of the impacted nodes, a path in the dependency graph between the matching node and the impacted node, wherein the path comprises an edge connected to the impacted node, and wherein the edge has a specific edge type.

7. A system, comprising:

a memory coupled to a computer processor;

a repository configured to store:
  original source code comprising a plurality of entities, wherein the plurality of entities each correspond to a location in the original source code,
  modified source code,
  a dependency graph comprising a plurality of nodes corresponding to the plurality of entities, and
  a location index that maps each location in the original source code to one of the plurality of nodes;

a difference generator, executing on the computer processor and using the memory, configured to identify a plurality of modified locations by comparing the modified source code to the original source code; and an impact analyzer, executing on the computer processor and using the memory, configured to:
  during an offline phase, generate (i) the dependency graph from the original source code, and (ii) the location index, and
  during an online phase following the offline phase and using the dependency graph and the location index:
    obtain, for each of the plurality of modified locations and by searching the location index, matching nodes of the plurality of nodes,
    determine, based on the comparing of the modified source code to the original source code, that a level of imprecision of the dependency graph exceeds a predetermined threshold,
    in response to determining that the level of imprecision exceeds the predetermined threshold, re-generate the dependency graph using the modified source code,
    determine, for each of the matching nodes, impacted nodes of the plurality of nodes reachable from the matching node, and
    identify, using the location index, impacted entities of the plurality of entities corresponding to the impacted nodes,
  wherein the difference generator identifies the plurality of modified locations during the online phase.

8. The system of claim 7, wherein the impact analyzer is further configured to:

obtain, for each of a plurality of tests, covered entities of the plurality of entities, identify, for each of the plurality of tests, covered impacted entities common to the impacted entities and the covered entities for the test, and obtain test priorities by prioritizing execution of the plurality of tests using the covered impacted entities for each of the plurality of tests.

9. The system of claim 8, wherein the impact analyzer is further configured to:

generate a report comprising the impacted entities and the test priorities.

10. The system of claim 7, wherein the difference generator is further configured to compare the modified source code to the original source code by determining modifications that result in the modified source code when applied to the original source code, and wherein each of the modifications comprises a first location in the original source code and a second location in the modified source code.

11. The system of claim 7, wherein the impact analyzer is further configured to:

identify, for each of the impacted nodes, a path in the dependency graph between the matching node and the impacted node, wherein the impacted node has a specific node type.

12. The system of claim 7, wherein the impact analyzer is further configured to:

identify, for each of the impacted nodes, a path in the dependency graph between the matching node and the impacted node, wherein the path comprises an edge connected to the impacted node, and wherein the edge has a specific edge type.

13. A non-transitory computer readable medium comprising instructions that, when executed by a computer processor, perform:

obtaining original source code comprising a plurality of entities, wherein the plurality of entities each correspond to a location in the original source code;

during an offline phase and by a computer processor, generating, from the original source code, (i) a dependency graph comprising a plurality of nodes corresponding to the plurality of entities and (ii) a location index that maps each location in the original source code to one of the plurality of nodes; and during an online phase following the offline phase and using the dependency graph and the location index:
  identifying a plurality of modified locations in the original source code by comparing modified source code to the original source code;
  determining, based on the comparing of the modified source code to the original source code, that a level of imprecision of the dependency graph exceeds a predetermined threshold;

in response to determining that the level of imprecision exceeds the predetermined threshold, re-generating the dependency graph using the modified source code;

obtaining, for each of the plurality of modified locations and by searching the location index, matching nodes of the plurality of nodes;

determining, for each of the matching nodes, impacted nodes of the plurality of nodes reachable from the matching node; and identifying, using the location index, impacted entities of the plurality of entities corresponding to the impacted nodes.

14. The non-transitory computer readable medium of claim 13, further comprising instructions that perform:

obtaining, for each of a plurality of tests, covered entities of the plurality of entities;

identifying, for each of the plurality of tests, covered impacted entities common to the impacted entities and the covered entities for the test; and obtaining test priorities by prioritizing execution of the plurality of tests using the covered impacted entities for each of the plurality of tests.

15. The non-transitory computer readable medium of claim 13, wherein comparing the modified source code to the original source code comprises determining modifications that result in the modified source code when applied to the original source code, and wherein each of the modifications comprises a first location in the original source code and a second location in the modified source code.

16. The non-transitory computer readable medium of claim 13, further comprising instructions that perform:

identifying, for each of the impacted nodes, a path in the dependency graph between the matching node and the impacted node, wherein the impacted node has a specific node type.

17. The non-transitory computer readable medium of claim 13, further comprising instructions that perform:

identifying, for each of the impacted nodes, a path in the dependency graph between the matching node and the impacted node, wherein the path comprises an edge connected to the impacted node, and wherein the edge has a specific edge type.

* * * * *